Figure 1:
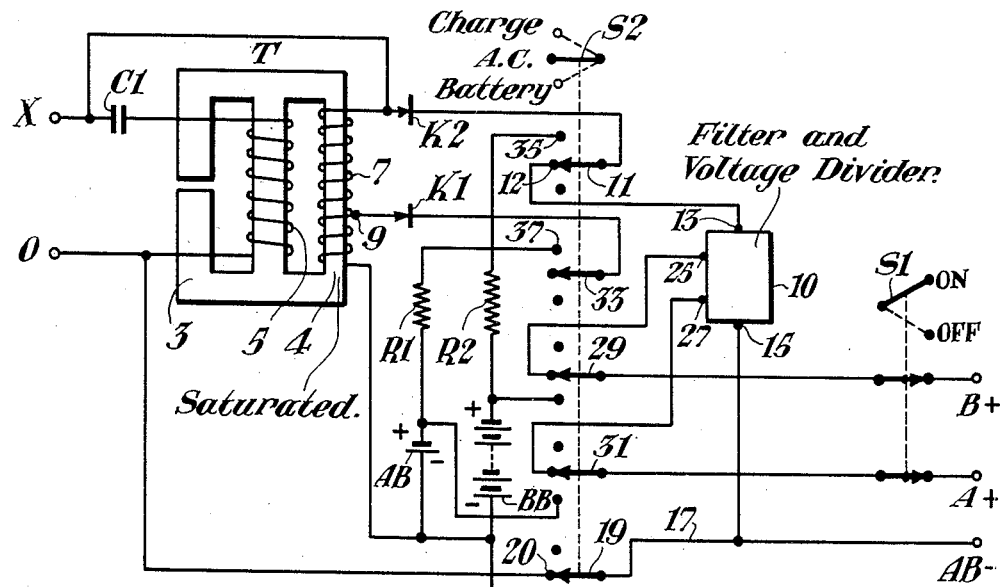

Dec. 6, 1949     R. M. GILSON ET AL     2,490,427

POWER SUPPLY MEANS

Filed Nov. 20, 1947

INVENTORS
Robert M. Gilson and
BY Linnie K. Hedding.

THEIR ATTORNEY

Patented Dec. 6, 1949

2,490,427

UNITED STATES PATENT OFFICE 2,490,427

POWER SUPPLY MEANS

Robert M. Gilson, Pittsburgh, and Linnie K. Hedding, Wilkinsburg, Pa., assignors to The Union Switch and Signal Company, Swissvale, Pa., a corporation of Pennsylvania Application November 20, 1947, Serial No. 787,248

2 Claims. (Cl. 171—97)

Our invention relates to power supply means, and particularly to power supply means for charging primary batteries or storage batteries of the type employed in portable radio units.

The chemical action which takes place in a dry cell when energy is supplied thereto is not fully understood, and in this disclosure, the term charging when applied to a dry cell battery will be understood to mean the restoration of the battery to or near its initial condition by passing current through the battery in the reverse direction. Also, the term normal voltage of a battery is here used to mean the voltage of the battery at its initial condition or slightly above that value as found necessary to bring the battery to its fully charged or reconditioned state.

It has heretofore been proposed to provide portable radio receivers with apparatus arranged so that the receiver may operate either from self-contained batteries, or from an available source of alternating current by the use of rectifiers. The batteries used in such arrangements may be of the dry cell type and it has been proposed to recharge them but this process requires careful regulation of the charging current, since an over-charge or an excessive charging current will ruin the battery.

Accordingly, it is an object of this invention to provide power supply means which may be employed in portable radio units and the like for charging primary or storage batteries associated with such a unit.

Another object of our invention is to provide a direct current power supply means for a portable radio unit which may be selectively employed to operate the unit or to charge the battery associated with the unit.

A further object of our invention is to provide a direct current power supply for a portable radio receiver which may be employed to operate the receiver and simultaneously charge the batteries associated with the receiver.

Another object of our invention is to provide a power supply means for charging dry cell batteries and wherewith the charge is automatically regulated to prevent over-charging the batteries.

Another object of this invention is to provide an improved type of power supply means.

Other objects of our invention and features of novelty will be apparent from the following description taken in connection with the accompanying drawings.

In practicing our invention we provide rectifiers of the dry disc type which may be supplied with alternating current energy from a transformer which is arranged to have a variable reluctance governed by the voltage supplied to the transformer and arranged so that the output voltage is held substantially constant, or the rectifiers may be supplied with energy directly from an alternating current source under certain conditions. By appropriate switching means, the direct current energy supplied from the rectifiers is supplied either directly to an associated load, such as, for example, a radio receiver through appropriate filtering circuits or to the primary or storage batteries associated with the load. Additionally, the switching means provides for the connection of the batteries directly to the load for operation thereof.

We shall describe two forms of power supply means embodying our invention and shall then point out the novel features thereof in claims.

Figure 2:
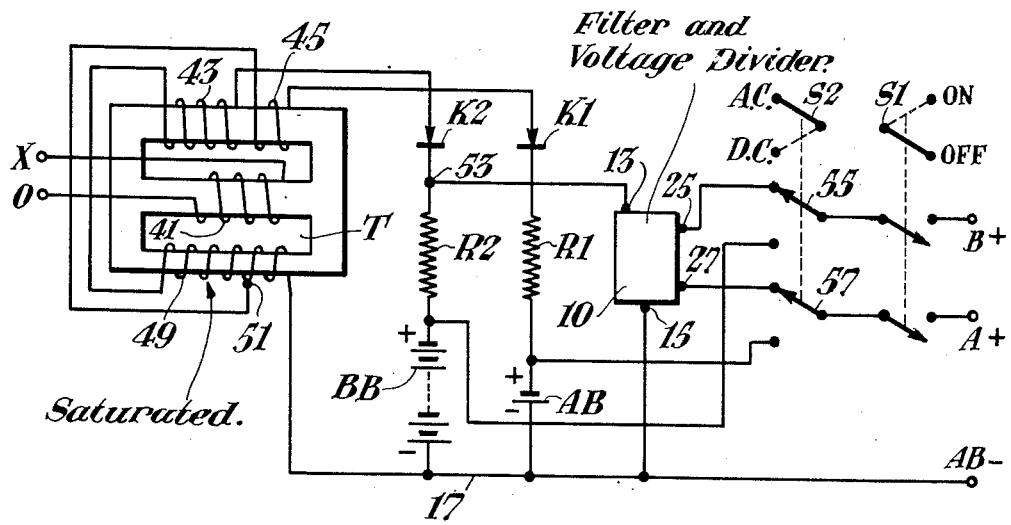

In the drawings, Fig. 1 is a diagrammatic view showing power supply means embodying our invention when used with a portable radio receiver, and Fig. 2 shows a modification which we may employ.

Similar reference characters refer to similar parts in each of the two views.

Referring to Fig. 1, a transformer T has a primary winding 5 mounted on the center leg of a three-legged core structure. A secondary winding 7 having a tap 9 is located on a second leg 4 of the core structure, and this leg of the core structure is arranged and constructed so that its reluctance is such that when energy of normal value is supplied to the primary winding 5 of the transformer, the second leg of the transformer will be saturated by the magnetic flux. A third leg 3 of the transformer core structure is proportioned for obtaining the proper relationship of the magnetic flux in the core structure, the leg 3 being preferably provided with an air gap. Dry disc rectifiers K1 and K2 act as half-wave rectifiers for the output of the secondary winding 7 of transformer T. Two switches S1 and S2, are provided for connecting the circuits in various combinations, and reference character 10 designates a filter and voltage divider such as are commonly used in power supply systems for radio receivers for filtering the direct current and for supplying energy at different voltages for the operation of the radio receiver. A condenser C1 is connected in series with the primary winding 5 of transformer T for purposes to be subsequently explained.

In accordance with usual practice, the reference characters B(+), A(+), and AB(—) designate the positive high voltage terminal, the positive low voltage terminal, and the common terminal, respectively, of the circuits of the radio receiver, not shown, for which the apparatus of Fig. 1 forms the power supply means. The batteries AB and BB are the low and high voltage batteries which may be either of the primary or storage type, and preferably are of the dry cell type.

In describing the operation of the apparatus shown in Fig. 1, it will be assumed for the purposes of description that switch S2 has been placed in the position shown and designated by the reference character AC, and that switch S1, which controls the supply power to the circuits of the radio receiver, has been placed in its "on" position.

When alternating current energy from a suitable source is supplied to the input terminals X and O, energy is supplied to the filter and voltage divider 10 by a circuit which is traced from terminal X, through rectifier K2, over movable contact 11 and stationary contact 12 of switch S2 to terminal 13 of the filter and voltage divider 10, and from terminal 15 of the filter and voltage divider 10 over common lead 17 and over movable contact 19 and stationary contact 20 to terminal 0. Additionally, the primary winding 7 is energized through condenser C1, and an electromotive force is induced in the secondary winding 7 of transformer T.

At this time, the energy induced in secondary winding 7 of transformer T does not have a completed circuit in which to flow, and the energy consumed by the primary winding 5 of transformer T is only that required for magnetization of the core.

Half-wave rectified voltage is supplied to the filter and voltage divider 10 over the circuit traced above, and is filtered by the filter components contained therein, and current at the proper voltages is then supplied to the circuits of the radio receiver, by connections which can be traced from terminals 25 and 27 of the filter and voltage divider, the contacts 29 and 31 of switch S2 in their center position, and thence through switch S1 to the terminals (B+) and A(+) of the radio receiver, a return circuit being established for the energy from the terminal AB(−), to the common connection 17, and thence back to terminal 15 of the filter and voltage divider 10.

The half-wave rectifier K1 is connected to a tap 9 on secondary winding 7 of transformer T, but at this time no energy flows through the circuit since the circuit is interrupted by contact 33 of switch S2.

Accordingly, it will be seen that at this time the apparatus embodying our invention, as shown in Fig. 1, serves to supply rectified and filtered direct current at various voltages to the circuits of the radio receiver, independently of the transformer T.

It will now be assumed that it is desired to supply energy to the radio receiver from the batteries AB and BB. Accordingly, switch S2 is operated to its lowermost position, as designated by the reference character Battery. In this position contacts 29 and 31 of switch S2 establish obvious circuits for connecting the positive terminals of batteries BB and AB through the contacts of switch S1 to the terminals B(+) and A(+) of the radio receiver, while the negative terminals of the batteries are connected to terminal AB(−) by stationary contact 21 and movable contact 19 of switch S2 and the common connection 17. At this time no alternating current energy will be supplied through transformer T.

If it is desired to charge batteries AB and BB, switch S2 is moved to its uppermost position designated by the reference character Charge, and a suitable source of alternating current energy is connected with the terminals X and O, as previously described.

Accordingly, alternating current energy is supplied to the primary winding 5 of transformer T through the condenser C1, and as a result alternating current energy is induced in the secondary winding 7 of the transformer. At this time, the common connection 17 is disconnected from terminal O by contact 19 of switch S2, thus interrupting the circuit previously traced for supplying energy to the filter and voltage divider 10. Energy is now supplied to battery BB by a circuit which may be traced from the upper end of secondary winding 7, through rectifier K2, contacts 11 and 35 of switch S2, and through resistor R2 to the positive terminal of battery BB, while the negative terminal of battery BB is connected to the lower end of secondary winding 7 of transformer T. Accordingly, half-wave rectified charging current will be supplied to battery BB through resistor R2. The resistor R2 is proportioned so that the flow of current will not become excessive while the battery is being charged. Half-wave rectified current is supplied to the low voltage battery AB by a circuit which may be traced from the tap 9 on the secondary winding 7 of transformer T through half-wave rectifier K1, over contacts 33 and 37 of switch S2 and through resistor R1 to the positive terminal of battery AB, while the negative terminal of battery AB is connected to the lower end of the secondary winding 7 of transformer T. The resistor R1 is selected so that the charging current supplied to the battery AB does not exceed the maximum permissive value.

The second leg of the core of transformer T on which secondary winding 7 is mounted is arranged and constructed in such manner that with normal voltage supplied to the terminals X and O, the flux through the second leg of the core is in the region of magnetic saturation, that is, an increase in the magnetomotive force due to the primary winding 5 will cause an increase in the flux flowing through the third leg 3 of the core only, the flux flowing through leg 4 increasing little or none.

If it is assumed at this time that the voltage of the alternating current energy supplied to the terminals X and O increases, the increased magnetomotive force in the center leg of the transformer on which primary winding 5 is mounted will tend to cause an increase in the flux in the other two legs of the transformer core. However, as explained above, the second leg 4 of the core is worked near its point of magnetic saturation, so that very little of the increased amount of flux flows through this leg of the transformer core, so that the increase in flux must take place in the third leg 3 of the core.

Accordingly, it will be seen that variations in the voltage of the energy supplied to the primary winding 5 of transformer T, will have little or no effect on the output voltage of secondary winding 7, with the result that the voltage of the energy supplied to the batteries is held substantially constant.

The apparatus is arranged and constructed so that the voltage applied across the batteries for charging the batteries is substantially equal in each case to the initial or normal voltage of the batteries. For example, if the battery BB is a dry battery having an initial or normal voltage of 90 volts when it is new, the voltage applied to this battery for recharging it is substantially 90 volts. Thus when the battery is recharged after it has become partially exhausted due to having been used to operate the radio receiver, and the voltage of the battery is brought back toward its normal value, the charging voltage never exceeds the normal voltage with the result that when the voltage of battery reaches its normal value there will be an equality between the battery voltage and the charging voltage and approximately no charging current flows through the battery. That is, the charging is terminated when the battery is brought back to its initial or normal voltage.

It has been found that the connection of a condenser, such as condenser C1, in series with the primary winding 5 of the transformer T, aids in the regulation of the output voltage of the secondary winding. By proper proportioning of the condenser and the inductance of the transformer, the peak values of the voltage supplied by the transformer is substantially constant over a relatively wide variation of the alternating current supply voltage.

Accordingly, it will be seen that our invention provides for a constant voltage regulation of the energy supplied to charge the batteries, so that when the voltage of the battery rises to its fully charged normal value, the charging current is diminished to substantially zero.

It will be apparent from the foregoing description that the transformer T is required to supply energy only during the time that the batteries are being charged. Since the value of energy supplied for charging the batteries is relatively small in comparison with the energy required to operate the receiver from an alternating current source through the filter and voltage divider 10, the transformer T may be smaller in construction than if it were required to furnish energy for the operation of the radio receiver, with the resultant advantage of reduction in size and weight, and lower cost.

Referring to Fig. 2, there is shown a modification of the arrangement shown in Fig. 1 which may be employed where it is desired to provide a higher degree of voltage regulation. As shown, transformer T is provided with a primary winding 41 mounted on one leg of the transformer core, and provided with terminals X and O. Two regulating windings 43 and 45 are mounted on a third leg of the core of transformer T, while a second leg of transformer T is constructed and proportioned so that under conditions of normal voltage, this second leg of the transformer is saturated. On the second leg of the transformer is mounted a secondary winding 49, having a low voltage tap 51. The circuits are arranged so that during the time when the radio receiver is being operated by alternating current supplied to terminals X and O, or when the supply of energy to the radio receiver is cut off but the supply of alternating current is continued to terminals X and O, the batteries BB and AB are charged by energy supplied through rectifiers K1 and K2, while the switching means also provides for the connection of batteries AB and BB directly to the radio receiver circuit.

In describing the operation of the arrangement shown in Fig. 2, it will be assumed that the receiver is to be operated by A. C. and accordingly, switch S2 is operated to its uppermost position designated by the refence character AC, and switch S1 is operated to its "on" position.

When alternating current energy from a suitable source is supplied to terminals X and O, the energy flows through primary winding 41 of transformer T, and induces an alternating current in secondary winding 49 which is mounted on the saturated leg of the core. Since the flux in the leg of the core on which secondary winding 49 is mounted is at its saturation point, it will be apparent that an increase in the voltage of the energy supplied to primary winding 41 will cause an increase in the flux in the core, but the voltage of the energy induced in secondary winding 49 will not be increased appreciably, as the leg of the core is already at its point of saturation.

As a result, when the voltage in primary winding 41 of transformer T increases, the voltage induced in secondary winding 49 of transformer T is increased by a much smaller amount.

The low voltage battery AB is supplied with energy at this time by a circuit which may be traced from tap 51 on secondary winding 49 of transformer T, through regulating winding 45 on the third leg of the core of transformer T, through half-wave rectifier K1, and through resistor R1 to the positive terminal of battery AB, and from the negative terminal of battery AB over the common connection 17 to the righthand end of the secondary winding 49 of transformer T.

The circuit for supplying half-wave rectified current to the high voltage battery BB may be traced from the left-hand terminal of the secondary winding 49 of transformer T, through regulating winding 43 on the third leg of the transformer core, through half-wave rectifier K2, and through resistor R2 to the positive terminal of battery BB, and from the negative terminal of battery BB to the common connection 17 and thence to the terminal at the righthand end of the secondary winding 49 of transformer T. Additionally, energy is supplied to the filter and voltage divider 10 at this time by a circuit which may be traced from a terminal 53 between rectifier K2 and resistor R2, through the filter and voltage divider 10 to the common connection 17 and thence to the righthand end of the winding 49 of transformer T. It will be seen therefore that the filter and voltage divider 10 is connected in multiple with resistor R2 and battery BB, so that half-wave rectified current is supplied at this time to both the battery BB and the filter and voltage divider 10 through half-wave rectifier K2.

After the energy has been filtered and divided by the filter and voltage divider 10, it is supplied from terminals 25 and 27 to contacts 55 and 57 of switch S2 in their uppermost position, and through the contacts of switch S1 to the terminals A(+) and B(+) of the radio receiver, and thence to the negative terminal AB(—) and through the common connection 17 to the filter and voltage divider 10.

Accordingly, it will be seen that our invention provides for operating the radio receiver by means of energy supplied from an alternating current source, while at the same time the primary or storage batteries associated with the portable receiver are being charged.

As previously explained the voltage of the energy induced in secondary winding 49 of transformer T is held substantially constant despite variations in the voltage of the energy supplied to primary winding 41. The regulating windings 43 and 45 on the third leg of the transformer are arranged so that the voltage developed therein tends to oppose the voltage developed in secondary winding 49, so that upon an increase of voltage in primary winding 41, the increase in flux flowing through the third leg of the transformer core will cause an increase in the opposing voltage induced in regulating windings 43 and 45, with the result that the tendency for the output voltage of secondary winding 49 to rise is balanced by the increase in the opposing voltage developed by regulating coils 43 and 45, so that a further regulating action is obtained by the use of these coils over what would be obtained by the use of the secondary winding 49 alone.

As explained in connection with Fig. 1, since the voltage of the energy induced in secondary winding 49 is held substantially constant, it will be apparent that as the voltage of batteries BB and AB approach their normal value as the batteries charge, the amount of current flowing therethrough will become less and less, until at the time when the voltage of the batteries reaches the voltage of the energy supplied from secondary winding 49 the current will be diminished to zero, and therefore it will be seen that a taper charging effect is obtained, so that the amount of energy supplied through the batteries is reduced as the voltage of the batteries increases.

When it is desired to operate the radio receiver from the batteries, switch S2 is operated to its lowermost position designated by the reference character DC, and contacts 55 and 57 of switch S2 in their lowermost position establish connections from the positive terminals of batteries BB and AB to the terminals B(+) and A(+), respectively, of the radio receiver, while since the negative terminals of batteries AB and BB are connected to the common lead 17 which in turn is connected to the common terminal AB(—), a circuit is now complete for supplying energy from the batteries to the radio receiver.

It is to be understood that our invention is not limited in its use to portable radio receivers and that this one application illustrates one of the many places in which power supply means embodying our invention is useful.

Although we have herein shown and described only two forms of power supply means embodying our invention, it is to be understood that various changes and modifications may be made therein within the scope of the appended claims without departing from the spirit and scope of our invention.

Having thus described our invention, what we claim is:

1. In a power supply means the combination comprising, a source of alternating current, a saturable transformer having a first and a second winding, a condenser, said first winding of said transformer and said condenser connected in series to said source, said transformer being saturated at a given rated voltage of said source, a load effectively energized at a definite normal unidirectional voltage, a battery having a rated voltage equal to said normal voltage, a rectifier, switching means to at times connect said load to said source through said rectifier and at other times to connect said battery to said load to energize the load, said switching means to at still other times connect said second winding of said transformer to said battery through said rectifier to charge the battery, and said condenser and transformer arranged to maintain the peak value of the voltage supplied by said second winding substantially equal to said normal voltage.

2. In a power supply means the combination comprising, a source of alternating current, a condenser, a saturable transformer having a first, a second, and a third winding, said first winding of said transformer and said condenser connected in series to said source, a load effectively energized when supplied with a definite normal high unidirectional voltage and a definite normal low unidirectional voltage, a first battery rated at said normal high voltage and a second battery rated at said normal low voltage, a first and a second rectifier; switching means operable to a first, a second and a third condition; said first condition to connect said load to said source through said first rectifier, said second condition to connect said first and second batteries to said load, said third condition to connect said second transformer winding to said first battery through said first rectifier and to connect said third winding to said second battery through said second rectifier, to charge the batteries, and said condenser and transformer windings arranged for the peak value of the voltage supplied to said second winding to equal said normal high voltage and the peak value of the voltage supplied by said third winding to equal said normal low voltage.

ROBERT M. GILSON.
LINNIE K. HEDDING.

REFERENCES CITED

The following references are of record in the file of this patent:

UNITED STATES PATENTS

| Number | Name | Date |
|---|---|---|
| 1,067,630 | Woodbridge | July 15, 1913 |
| 1,400,856 | Bliss | Dec. 20, 1921 |
| 1,916,307 | Gilson | July 4, 1933 |
| 1,995,652 | Reichard | Mar. 26, 1935 |
| 2,000,571 | Oswald | May 7, 1935 |
| 2,028,541 | Gilson | Jan. 21, 1936 |
| 2,029,628 | Lord | Feb. 4, 1936 |
| 2,085,061 | Aggers | June 29, 1937 |
| 2,136,243 | Hedding | Nov. 8, 1938 |
| 2,235,330 | Pugh | Mar. 18, 1941 |
| 2,253,705 | Hedding et al. | Aug. 26, 1941 |
| 2,341,446 | Klinkhamer et al. | Feb. 8, 1944 |
| 2,346,997 | Priest | Apr. 18, 1944 |
| 2,355,351 | Willing | Aug. 8, 1944 |
| 2,377,180 | Pohm | May 29, 1945 |
| 2,423,114 | Potter | July 1, 1947 |
| 2,431,311 | Cronvall | Nov. 25, 1947 |

FOREIGN PATENTS

| Number | Country | Date |
|---|---|---|
| 492,908 | Great Britain | Sept. 29, 1938 |
| 563,991 | Germany | Nov. 11, 1932 |
| 617,336 | Germany | Aug. 16, 1935 |
| 793,186 | France | Nov. 16, 1935 |

OTHER REFERENCES

Radiocraft, July 1941, pages 51–54.